US008060053B2

(12) United States Patent
Hirsch

(10) Patent No.: US 8,060,053 B2
(45) Date of Patent: Nov. 15, 2011

(54) WIRELESS LAN DEVICE AND CORRSPONDING METHOD FOR POWER SAVING IN WIRELESS LOCAL AREA NETWORKS (WLAN) SUPPORTING PEER TO PEER COMMUNICATIONS

(75) Inventor: Olaf Hirsch, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 694 days.

(21) Appl. No.: 11/574,241

(22) PCT Filed: Aug. 30, 2005

(86) PCT No.: PCT/IB2005/052842
§ 371 (c)(1),
(2), (4) Date: Oct. 16, 2007

(87) PCT Pub. No.: WO2006/025024
PCT Pub. Date: Mar. 9, 2006

(65) Prior Publication Data
US 2008/0181153 A1 Jul. 31, 2008

Related U.S. Application Data

(60) Provisional application No. 60/605,919, filed on Aug. 30, 2004.

(51) Int. Cl.
*H04B 1/16* (2006.01)
*H04B 7/00* (2006.01)
*H04W 4/00* (2009.01)

(52) U.S. Cl. ............... 455/343.2; 455/343.3; 455/343.5; 455/41.2; 370/328; 370/338

(58) Field of Classification Search .................. 370/328, 370/338; 455/41.2, 552.1, 553.1, 574, 343.2, 455/343.4, 343.5, 344
See application file for complete search history.

(56) References Cited

U.S. PATENT DOCUMENTS

| 5,949,776 | A | 9/1999 | Mahany et al. |
| 6,463,307 | B1 | 10/2002 | Larsson et al. |
| 7,242,971 | B2* | 7/2007 | Park .............................. 455/574 |
| 7,542,437 | B1* | 6/2009 | Redi et al. ...................... 370/311 |
| 2001/0005686 | A1* | 6/2001 | Naito et al. ...................... 455/574 |
| 2003/0118015 | A1 | 6/2003 | Gunnarsson et al. |
| 2004/0153676 | A1* | 8/2004 | Krantz et al. ................... 713/300 |

FOREIGN PATENT DOCUMENTS

EP 1089578 4/2001

* cited by examiner

*Primary Examiner* — Un C Cho

(57) ABSTRACT

A wireless device (110) is provided for supporting peer to peer communications. A transceiver (132) is configured to receive and transmit data over a wireless link. A network activity sensor (136) is coupled to the transceiver and configured to sense peer to peer activity by the transceiver and generate a network activity sensor signal. A controller (140) is coupled to the network activity sensor (136) and the transceiver (132), and configured to selectively deactivate a portion of the wireless device based at least in part on the network activity sensor signal. Advantages of the invention include the ability to prolong battery life in wireless devices.

16 Claims, 2 Drawing Sheets

WIRELESS LAN DEVICE AND CORRSPONDING METHOD FOR POWER SAVING IN WIRELESS LOCAL AREA NETWORKS (WLAN) SUPPORTING PEER TO PEER COMMUNICATIONS

CROSS REFERENCE TO RELATED APPLICATION

This application claims the benefit of U.S. provisional application Ser. No. 60/695,919 filed 2004 Aug. 30, which is incorporated herein whole by reference.

The present invention relates to the general field of wireless local area network (WLAN) and more particularly to improving battery life in mobile devices while simultaneously providing support for peer to peer networks.

Peer to peer networks, often referred to as P2P, capitalize on the presence of friendly cooperation by a number of network devices. P2P networks typically search out desired resources (e.g. files or members) by polling other network devices to identify the shortest path between the initiating member and the desired resource. Since the network devices participating in the P2P network help one another locate the desired resource, the resource search can be very efficient. However, each of these participating network devices must provide assistance with the P2P functions such as routing and storage.

With the advent of wireless devices, the number of wireless local area networks (WLAN) is increasing. P2P functions are also taking hold in the WLAN networks. However, since wireless devices often run on batteries, there is a battery drain associated with participating in the WLAN P2P network and performing the requisite functions on a continuous basis. Consequently, such participation can significantly reduce battery life of a wireless device.

What is needed is a technique for supporting P2P WLAN networks with wireless devices while still providing reasonable battery life of wireless devices.

The invention provides an apparatus and method for supporting mobile device participation in wireless local area networks while providing reasonable battery life for the mobile wireless devices. In an exemplary embodiment, the invention provides a controller to selectively deactivate a portion of the device based on the needs of the P2P network. This supports the functionality of the P2P network while also promoting usable battery life.

An exemplary embodiment of the invention comprises a mobile wireless device that includes a circuit configured to periodically sense the presence of P2P WLAN network activity. When there is activity that needs support from the wireless device, the device provides the network support. When that activity terminates, the device performs a process of selective deactivation.

An exemplary wireless device is provided for supporting peer to peer communications. A transceiver is configured to receive and transmit data over a wireless link. A network activity sensor is coupled to the transceiver and configured to sense peer to peer activity by the transceiver and generate a network activity sensor signal. A controller is coupled to the network activity sensor and the transceiver, and configured to selectively deactivate a portion of the wireless device based at least in part on the network activity sensor signal.

Advantages of the invention include the ability to prolong battery life in mobile wireless devices.

The invention is described with reference to the following figures.

The invention is described with reference to specific apparatus and embodiments. Those skilled in the art will recognize that the description is for illustration and to provide the best mode of practicing the invention. While references are made to specific wireless devices and protocols, the invention is applicable to many different types of devices and protocols. For example, while the wireless protocol 802.11 is used herein, the invention is applicable to other protocols and communication techniques such as cellular communication, as well as analog and digital variations. Also, while the Internet is used as an exemplary communications network, other types of networks can be used with the invention.

Figure 1:
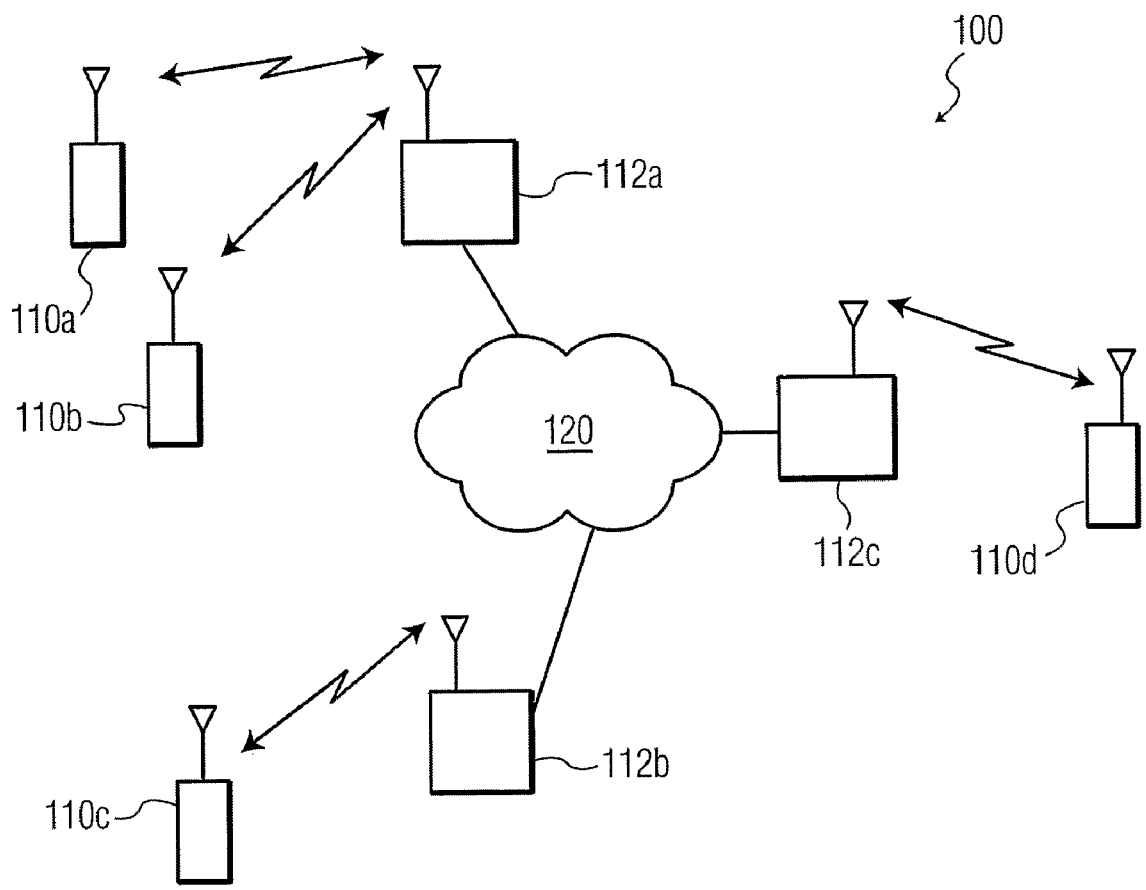
FIG. 1 depicts an exemplary peer to peer wireless network showing a number of wireless devices communicating with one another over the network and with an access point.

FIG. 1 depicts an exemplary peer to peer wireless local area network 100 (WLAN) showing a number of wireless devices 110a-110d communicating with one another over the network. These devices have the ability to communicate with one another. The devices 110a-110d are, for example, telephones, personal digital assistants (PDAs), laptop computers or other electronic devices. Moreover, some of these devices may be on battery power while others may be powered by an available power outlet. Some of the devices can also be connected to the network through a wired network e.g. Ethernet.

WLAN access points 112 are provided for the devices to connect with the Internet 120. While three access points are shown in FIG. 1, there may be many more access points and each may be connected directly to the Internet or through other routers or switches to one another and/or the Internet.

The peer to peer (P2P) aspect of the communication network shown in FIG. 1 is provided by each of the devices 110a-110d assisting the communication between desired users. For example, if device 110b wanted to communicate with device 110d, device 110c can provide a link to assist with their communication. The nature of P2P networks is such that ad-hoc communication paths can be established by the assistance of devices participating in the P2P network. However, in order to participate in the P2P network, the device must be powered on, which depletes the battery.

Figure 2:
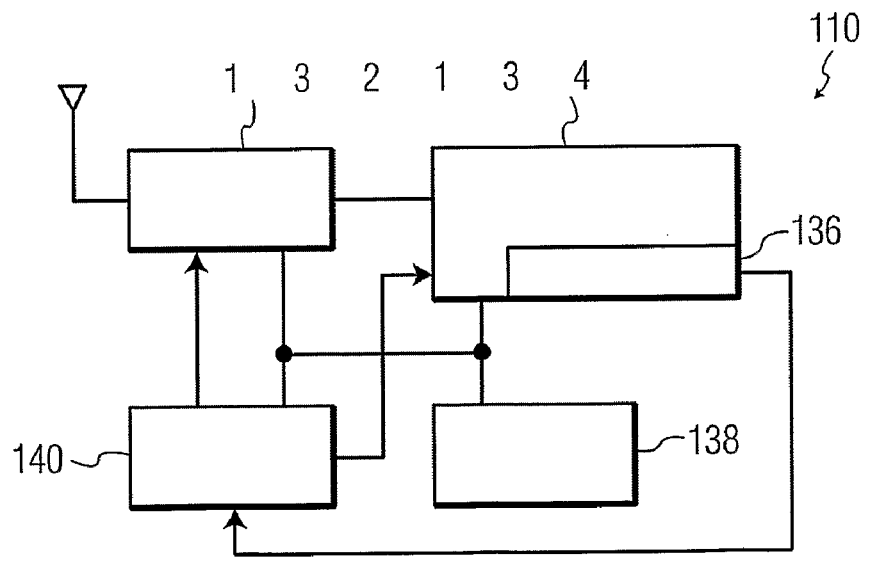
FIG. 2 depicts an exemplary wireless device according to an embodiment of the invention.

FIG. 2 depicts an exemplary wireless device 110 according to an embodiment of the invention. A transceiver 132 is configured to receive and transmit data over a wireless link. The transceiver is coupled to device electronics 134 that perform the devices functions. A network activity sensor 136 included in the device electronics and coupled to the transceiver. The activity sensor is configured to sense peer to peer activity by the transceiver and generate a network activity sensor signal. A power cycle controller 140 is coupled to the network activity sensor and the transceiver. The controller is configured to selectively deactivate a portion of the wireless device based at least in part on the network activity sensor signal.

In one aspect of the invention, the controller 140 is configured to selectively deactivate the transceiver 132 based at least in part on the network activity sensor signal. In another aspect of the invention, the controller 140 is configured to selectively deactivate a portion of device electronics 134 based at least in part on the network activity sensor signal. In yet another aspect of the invention, the controller 140 is configured to selectively deactivate the transceiver 132 and a portion of device electronics 134 based at least in part on the network activity sensor signal. In these and other aspects of the invention, the deactivation can be based on a time period (e.g. seconds) or based on user input or lack thereof (e.g. notifying the user that the device is deactivated and allowing the user to reactivate the device through a button or command).

The level of P2P support provided by the device 110 can also be based on power supply attributes including whether the device is powered by an outlet or battery 138 and the battery level. An outlet power supply would allow the device to support P2P activity full-time without draining the battery. Alternately, the level of P2P support may be based on the battery condition, for example, a fully charged battery 138 can offer more support while a lower charged battery would offer less support. This degree of P2P support can be factored into the power duty cycle applied by the controller 140. For example, the controller would deactivate portions of the device less frequently with a fully charged battery and more frequently with a lower charged battery. This can also be put into the context of the controller may put the device to sleep for shorter duration with a fully charged battery and for longer duration with a lower charged battery.

Figure 3:
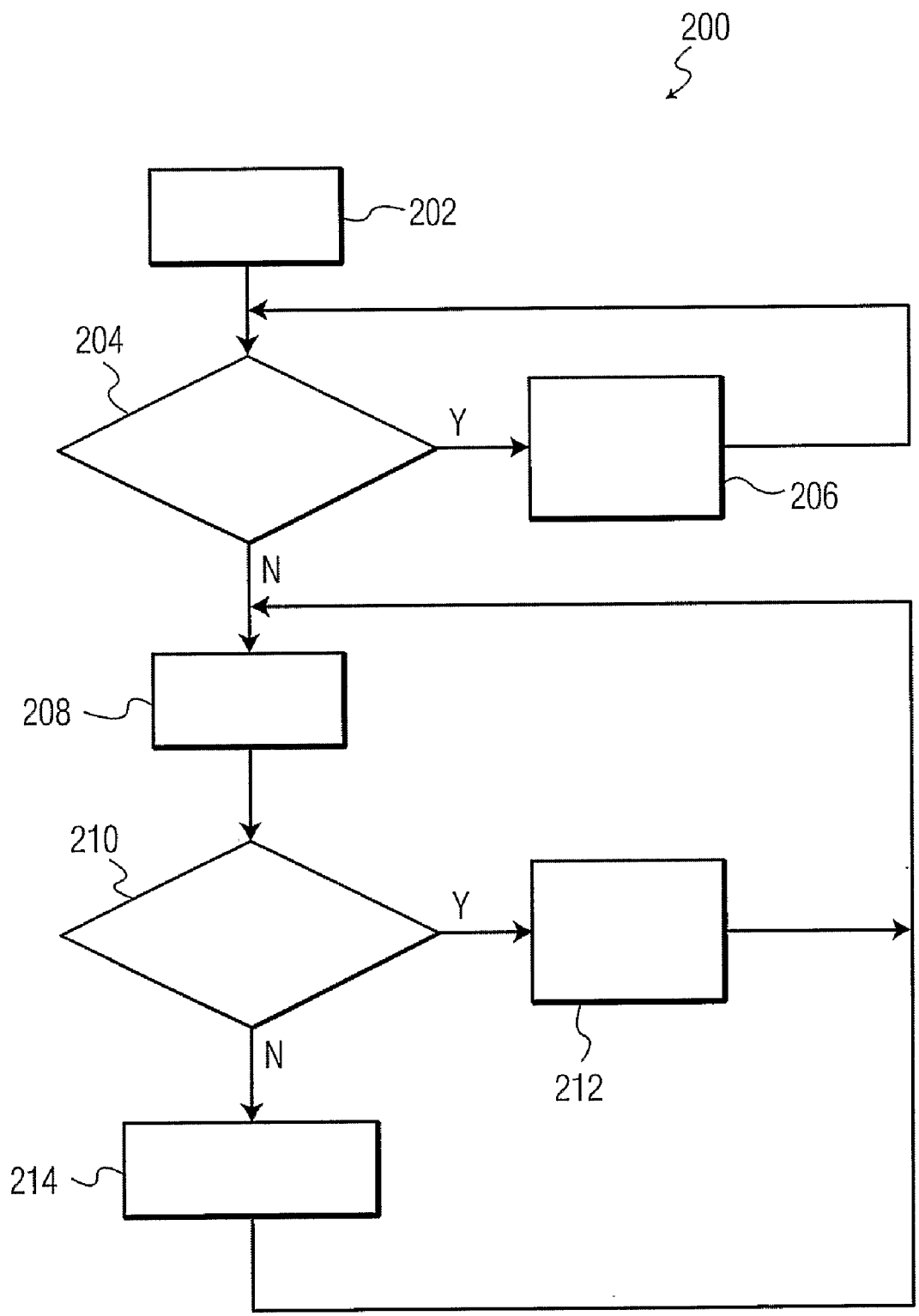
FIG. 3 is a flow diagram showing a method for improving the battery life of wireless devices operating in a peer to peer network according to an embodiment of the present invention.

FIG. 3 is a flow diagram 200 showing a method for improving the battery life of wireless devices operating in a peer to peer network according to an embodiment of the present invention. In step 202, the device is powered on by the user. Step 204 determines whether the device is in use by the user and if so, step 206 ensures that the device is provided with standard power. In the case of a cell phone, the standard power may be full power. However, in the case of a laptop computer, the standard power may be a raised or lowered clock rate or other power functions that are applied under normal circumstances.

Presuming the device is not currently in use, step 208 detects the presence of P2P activity, which is performed by the activity sensor 136. Step 210 determines if there is activity, and if so, step 212 continues to provide standard power to the device. Standard power in this case may be different than that provided in step 206. For example, the device may have a hibernation mode to turn off a display or other components while still participating in the P2P network and providing P2P support. A description of exemplary techniques that may be employed in this step are explained above. In any event, if step 210 determines that there is no activity, step 214 deactivates a portion of the wireless device. In this aspect of the invention, the device is deactivated for a predetermined time. As explained above, other deactivation aspects are also anticipated.

Advantages of the invention include the ability to prolong battery life in mobile wireless devices.

Having disclosed exemplary embodiments and the best mode, modifications and variations may be made to the disclosed embodiments while remaining within the subject and spirit of the invention as defined by the following claims.

What is claimed is:

1. A wireless device supporting peer to peer communications, comprising:
    a transceiver configured to receive and transmit data over a wireless link;
    a network activity sensor coupled to the transceiver and configured to sense peer to peer activity by the transceiver and generate a network activity sensor signal; and
    a controller coupled to the network activity sensor and transceiver, and configured to selectively deactivate a portion of the wireless device based at least in part on the network activity sensor signal, wherein the deactivated portion comprises a portion of device electronics other than the transceiver;
    wherein the wireless device operates on battery power from a battery, and the controller is configured to selectively deactivate the portion of device electronics based at least in part on a battery charge condition of the battery by applying a change to a power duty cycle of the portion of device electronics based at least in part on a battery charge level of the battery.

2. The wireless device of claim 1, wherein the controller is configured to selectively deactivate the transceiver based at least in part on the network activity sensor signal.

3. The wireless device of claim 2, wherein the controller is configured to selectively deactivate the portion of device electronics of the wireless device based at least in part on a power supply attribute.

4. The wireless device of claim 1, wherein the controller is configured to selectively deactivate the transceiver for a predetermined period of time based at least in part on the network activity sensor signal.

5. The wireless device of claim 1, wherein the controller is configured to selectively deactivate the portion of device electronics for a predetermined period of time based at least in part on the network activity sensor signal.

6. The wireless device of claim 1, wherein the controller is configured to selectively deactivate the portion of device electronics of the wireless device based at least in part on a power supply attribute.

7. The wireless device of claim 1, wherein the network activity sensor is included in the device electronics.

8. A method for improving battery life in a wireless device having a transceiver for use in a peer to peer network, comprising the steps of:
    receiving and transmitting data over a wireless link;
    sensing peer to peer activity by the transceiver and generating a network activity sensor signal;
    selectively deactivating a portion of the wireless device based at least in part on the network activity sensor signal, wherein the deactivated portion comprises a portion of device electronics other than the transceiver; and
    operating the wireless device on battery power from a battery;
    wherein the selectively deactivating step includes selectively deactivating the portion of device electronics based at least in part on a battery charge condition of the battery by applying a change to a power duty cycle of the portion of device electronics based at least in part on a battery charge level of the battery.

9. The method of claim 8, wherein the selectively deactivating step includes the step of selectively deactivating the transceiver based at least in part on the network activity sensor signal.

10. The method of claim 9, wherein the selectively deactivating step includes the step of selectively deactivate the portion of device electronics of the wireless device based at least in part on a power supply attribute.

11. The method of claim 8, wherein the selectively deactivating step includes the step of selectively deactivating the transceiver for a predetermined period of time based at least in part on the network activity sensor signal.

12. The method of claim 8, wherein the selectively deactivating step includes the step of selectively deactivating the portion of device electronics for a predetermined period of time based at least in part on the network activity sensor signal.

13. The method of claim 8, wherein the selectively deactivating step includes the step of selectively deactivate the portion of device electronics of the wireless device based at least in part on a power supply attribute.

14. A wireless device using battery power to support peer to peer communications, comprising:
   a transceiver configured to receive and transmit data over a wireless link;
   a network activity sensor coupled to the transceiver and configured to sense peer to peer activity by the transceiver and generate a network activity sensor signal; and
   a controller coupled to the network activity sensor and transceiver, and configured to selectively deactivate a portion of the wireless device based at least in part on a combination of the network activity sensor signal and a battery condition indicative of a battery charge level of a battery of the wireless device, wherein selectively deactivating the portion of device comprises applying a change to a power duty cycle of the portion of the device.

15. The wireless device of claim 14, wherein the controller is configured to selectively deactivate the transceiver based at least in part on the combination of the network activity sensor signal and the battery condition.

16. The wireless device of claim 14, wherein the controller is configured to selectively deactivate a portion of device electronics, other than the transceiver, based at least in part on the combination of the network activity sensor signal and the battery condition.

* * * * *